United States Patent [19]

Young

[11] Patent Number: 5,421,880

[45] Date of Patent: Jun. 6, 1995

[54] METHOD AND APPARATUS FOR USING STEEL SLAG IN CEMENT CLINKER PRODUCTION

[75] Inventor: Rom D. Young, Dallas, Tex.

[73] Assignee: Texas Industries, Inc., Dallas, Tex.

[21] Appl. No.: 182,617

[22] Filed: Jan. 14, 1994

[51] Int. Cl.$^6$ .................................................. C04B 7/36
[52] U.S. Cl. ...................................... 106/756; 106/745; 106/767; 106/791; 106/792
[58] Field of Search ................ 106/793, 757, 756, 758, 106/767, 789, 792, 791, 745

[56] References Cited

U.S. PATENT DOCUMENTS

| | | | |
|---|---|---|---|
| 530,247 | 12/1894 | Stein | 106/789 |
| 982,945 | 1/1911 | Forell | 106/767 |
| 998,358 | 7/1911 | Lessing | 106/767 |
| 2,600,515 | 6/1952 | Mooser | 106/767 |
| 4,054,464 | 10/1977 | Thorn, Jr. et al. | 106/767 |
| 4,174,974 | 11/1979 | Fondriest | 106/767 |
| 4,191,546 | 4/1980 | Kroyer | 65/20 |
| 5,156,676 | 10/1992 | Garrett et al. | 106/745 |

FOREIGN PATENT DOCUMENTS 1167164A 7/1983 U.S.S.R. .

OTHER PUBLICATIONS

ACI Committee, "Ground Granulated Blast-Furnace Slag as a Cementitious Constiuent in Concrete", pp. 226.1R-1-226.1R-15, ACI 1987 No month.
ASTM Committee, "Standard Specification for Ground Granulated Blast-Furnace Slag for Use in Concrete and Mortars", pp. 495-499, ASTM Jun. 1989.
Maslehuddin et al., "Corrosion of Reinforcing Steel in Concrete Containing Slag or Pozzolans", pp. 24-31, ASTM 1990 No month.
Douglas et al., "Characterization of Ground Granulated Blast-Furnace Slags and Fly Ashes and Their Hydration in Portland Cement Blends", pp. 38-46, ASTM 1990 No month.
Sarkar et al., "Synergistic Roles of Slag and Silica Fume in Very High Strength Concrete", pp. 32-37, ASTM 1990 No month.
Cowan et al., "Conversion of Drilling Fluids to Cements with Blast Furnace Slag: Performance Properties and Applications for Well Cementing", pp. 277-288, Society of Petroleum Engineers (Date unknown).
"Engineering and Design Standard Practice for Concrete", 2-2 and 2-10, Department of the Army, Corps of Engineers, Sep. 5, 1985.

Primary Examiner—Mark L. Bell
Assistant Examiner—Michael Marcheschi
Attorney, Agent, or Firm—Jones, Day, Reavis & Pogue

[57] ABSTRACT

A process and apparatus by which steel slag can be added to the feedstock materials fed into the feed-end of a rotary cement kiln to form cement clinkers. The steel slag is crushed and screened to provide steel slag particles having a maximum diameter of 2".

7 Claims, 2 Drawing Sheets

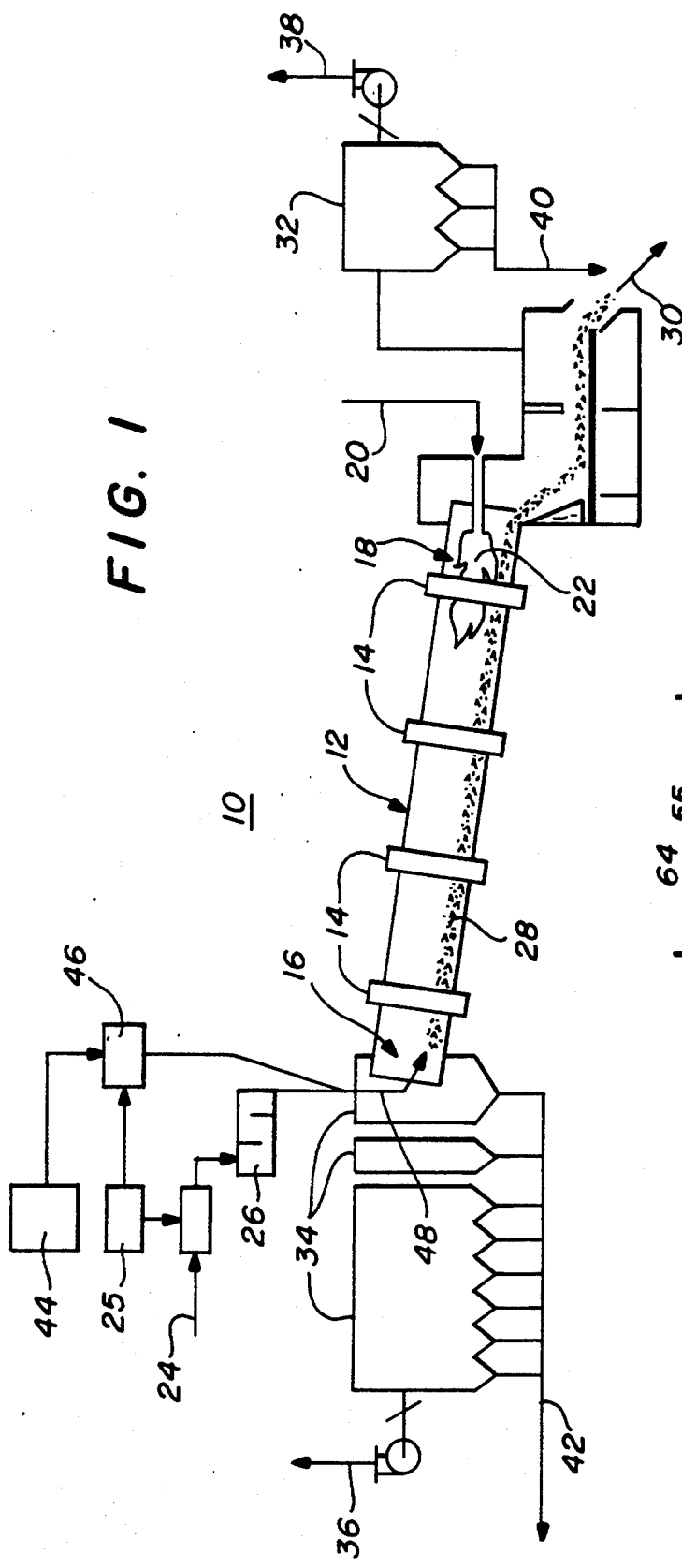

METHOD AND APPARATUS FOR USING STEEL SLAG IN CEMENT CLINKER PRODUCTION

BACKGROUND OF THE INVENTION

1. Field of the Invention

This invention relates in general to the manufacture of cement clinker in long rotary kilns. In particular, the invention relates to the method and apparatus for the manufacture of cement clinker in conventional long wet or dry rotary kilns wherein steel slag is added at the input-end of kiln with a stream of feedstock material containing lime such that as the stream of feedstock and steel slag moves toward the heat at the heat-end of the kiln, the steel slag is melted and defused into the feedstock material to form cement clinkers.

2. State of the Art

As stated in U.S. Pat. No. 5,156,676, the literature is replete with processes by which the calcining and clinkering of cement ingredients can be accomplished. The typical process using a rotary kiln, either wet or dry, is well known. Cement raw materials such as limestone, clay and sand, or the like, are finely ground and intimately mixed to provide a substantially homogeneous mixture at the input or feed-end of the kiln. The kiln is tipped downwardly at an angle such that the heat-end of the kiln is below the feed-end. The kiln has generally four operating zones including a precalcining zone, a calcining zone, a clinkering zone, and a cooling zone. Conventional fuel is combined with preheated air and injected into the kiln at the heat-end. Fuels such as natural gas, oil or powdered coal are conventionally employed in cement manufacturing processes.

As the finely divided cement raw materials pass into the rotating kiln at the feed-end thereof, the materials are heated from near ambient temperature to about 538° C. (1000° F.) in the precalcining zone. In this zone, the heat of the combustion gases from the calcining zone is used to raise the temperature of the raw materials. Additionally, in the kiln, chain systems or the like may be attached to the interior of the kiln and are employed to improve the efficiency of heat exchange between the gases and raw materials.

The temperature of the raw materials is increased from about 538° C. (1000° F.) to about 1093° C. (2000° F.) as they pass through the calcining zone and in this zone $CaCO_3$ is decomposed with the evolution of $CO_2$.

Calcined material at the temperature of about 1093° C. (2000° F.) then passes into the clinkering or burning zone where the temperature is raised to about 1500° C. (2732° F.). It is in this zone that the primary raw materials are converted into the typical cement compounds such as tricalcium silicate, dicalcium silicate, tricalcium aluminate, and tetracalcium-aluminoferrite. The cement clinkers then leave the clinkering zone where the clinkers are cooled and thereafter processed further such as by grinding.

Further, the use of ground blast-furnace slag as a cementitious material dates back to 1774. In the production of iron, the blast furnace is continuously charged from the top with iron oxide sources, fluxing stone, and fuel. Two products are obtained from the furnace: molten iron that collects in the bottom of the furnace and liquid iron blast-furnace slag floating on the pool of iron. Both are periodically tapped from the furnace at a temperature of about 1500° C. (2732° F.). The slag consists primarily of silica and alumina combined with calcium and magnesium oxides from the fluxing stone. Cementitious activity of this slag for use in mortar or concrete is determined by its composition and the rate at which the molten material is cooled when it comes from the furnace.

Further, in the production of steel, a similar process occurs wherein liquid steel slag floats on the pool of steel. Again, the steel slag consists primarily of silica and alumina combined with calcium and magnesium oxides. Disposing of both the steel slag and the blast-furnace slag poses a major disposal problem for the manufacturer thereof because of the volumes of material involved.

Both the steel slag and the blast-furnace slag is composed of particles that are very hard. The blast-furnace slag, when used, has always been in a finely powdered form, which means that a great deal of energy must be used to grind and pulverize the slag into the finely powdered form. Such a process is disclosed in U.S. Pat. No. 2,600,515 in which a blast-furnace slag, in a finely powdered mixture with limestone, is fed in rotary cement kilns and is introduced directly into the flame of the kiln. The slag powder is blown in at the same time and by the same channels as the fuel, namely pulverized coal, heavy oil or gas. This process has several disadvantages. One of the most significant disadvantages is that enormous amounts of energy are required to pulverize and dry the material so that it could be blown into the furnace.

Many of the chemical compounds in steel slag and blast-furnace slag are common to cement chemical compounds and their heat of formation is already been accomplished in their respective processes. X-ray diffraction analysis of steel slag shows the composition to be a highly fluxed beta ($\beta$) dicalcium silicate $2CaO.SiO_2(C_2)$. This compound, with the addition of CaO, can be converted to $3CaO.SiO_2$ ($C_3S$) in the burning zone of the rotary kiln.

Applicants experience has shown steel slag to have no deleterious effect on the operation of a cement rotary kiln. Emission of volatile materials from the rotary kiln is improved because the slag has previously been heat treated and most volatile materials have been removed, i.e. carbon dioxide, carbon, volatile organics, and the like. However, as stated, fine grinding or comminution or pulverization of the slag is required, thus adding an expensive step to the cement-making process.

SUMMARY OF THE INVENTION

Because it has long been recognized that many of the chemical compounds in steel slag are common to cement chemical compounds and because steel slag is available in large quantities and presents a major disposal problem, it would be advantageous to be able to use the steel slag in the cement-making process if it could be used in a much coarser state than the pulverized state now required and if it could be added to the feedstock materials being fed to the kiln at the feed-end of the kiln instead of the heat-end thereof.

The present invention provides such use of steel slag and provides a method and apparatus for utilization of various steel process slags that have been crushed and screened to provide a coarse state with component diameters up to 2" with the coarse slag being fed into the input-end of the kiln with the feedstock materials, thereby obtaining all of the advantages of the use of steel slag without the disadvantage of the requirement to provide fine grinding, pulverizing or comminution of the slag.

As stated previously, applicants experience has shown steel slag to have no deleterious effect on the operation of a cement rotary kiln. Emission of volatile materials from the rotary kiln is improved because the steel slag has previously been heat-treated and most volatile materials have been removed, i.e. carbon dioxide, carbon, volatile organics, and the like. Because of the previous history of the steel slag, the required steel slag chemistry has already been achieved during the steelmaking process thus conserving energy in the cement-making process. Thus there are a number of advantages of the use of this slag. First, as stated earlier, no fine grinding, pulverizing or comminution of the slag is required. Large quantities of coarse slag (defined herein as steel slag having components up to 2" in diameter) can be incorporated into the cement clinker composition with only minor chemical changes to the regular material feed to the rotary kiln. Crushing and screening is required only for slag particles in excess of 2" in diameter.

Second, no drying of the slag is required. Inherent moisture normally runs 1% to 6%. In the wet process rotary kiln system, substantial moisture reduction and savings are realized. In the dry process rotary kiln system, it is not required that the steel slag be dried.

Third, no plugging of the kiln has been experienced due to mud ring or clinker buildup. In both the wet and the dry process rotary kilns, the coarse steel slag has a cleaning effect on material buildup as it moves through the kiln.

Fourth, the coarse steel slag can be utilized as part of the initial feedstock and is introduced into the kiln at the feed-end thereof. The steel slag and wet feedstock may be injected into the feed-end of the rotary kiln as separate materials and may be injected together at the feed-end of the kiln without prior blending.

Fifth, only slight chemical changes in the feedstock composition are required for the normal feedstock to accommodate the steel slag. This usually means the feedstock must be richer in lime content.

Six, the coarse steel slag chemical compound structure transforms to the desired cement clinker structure during the heat treatment within the rotary kiln by diffusion.

Seventh, substantial energy savings are realized when the steel slag is utilized because of the low temperature at which the steel slag melts and because no grinding or pulverizing of the steel slag is required.

Eight, production increases are almost proportional to the amount of steel slag utilized.

Ninth, the environmental condition of the rotary kiln process improves because of the low volatile content of the steel slag.

Tenth, recycling of the steel slag improves the environment because it provides an important use for the large quantities of steel slag available and disposal of the steel slag at may present a problem.

Eleventh, the cost of cement production is substantially reduced because of the energy savings, and the plentiful supply of low cost steel slag. Thus, it is an object to the present invention to provide an improved method and apparatus for operating a rotary kiln for the production of cement clinker using coarse steel slag, a by-product of the steel-making processes.

It is another object to the present invention to introduce the coarse steel slag into a cement-making rotary kiln at the feed-end thereof.

It is still another object of the present invention to use coarse steel slag having various particle sizes from a maximum of substantially 2" in diameter and below.

Thus, the present invention relates to a method of cement clinker manufacture using an elongated rotary cement kiln having a feed-end and a heat-end, the heat-end being tilted downwardly with respect to the feed-end, the method comprising the steps of directing heat from a heat source into the heat-end of the kiln, introducing a stream of feedstock material containing lime into the feed-end of the kiln such that the stream of feedstock material moves toward the heat at the heat-end of the kiln, and adding a predetermined amount of crushed and screened steel slag to the stream of feedstock material at the feed-end of the kiln such that as the stream of feedstock material and steel slag moves toward the heat-end of the kiln, the steel slag is melted by the heat and diffused into the feedstock material to form cement clinkers.

The invention also relates to apparatus for forming cement clinkers comprising a rotary cement kiln having a feed-end and a heat-end, the heat-end being tilted downwardly with respect to the feed-end, a heat source at the heat-end for heating the interior of the rotary kiln, and conveying means for introducing a stream of feedstock material containing lime and steel slag into the feed-end of the rotary kiln such that as the stream of feedstock material and steel slag move toward the heat-end of the kiln, the steel slag is diffused by the heat into the feedstock material to form cement clinker.

BRIEF DESCRIPTION OF THE DRAWINGS

These and other more detailed objects of the present invention will be more fully disclosed in the following DETAILED DESCRIPTION OF THE DRAWINGS in which:

FIG. 1 is a basic diagrammatic representation of a rotary kiln system of the present invention for forming cement clinkers in which the feedstock material and the steel slag are fed together into the input-end of the rotary kilns;

FIG. 2 is a diagrammatic representation of the feedstock material and the steel slag being feed separately into the inlet-end of the rotary kiln.

DETAILED DESCRIPTION OF THE DRAWINGS

Figure 3:
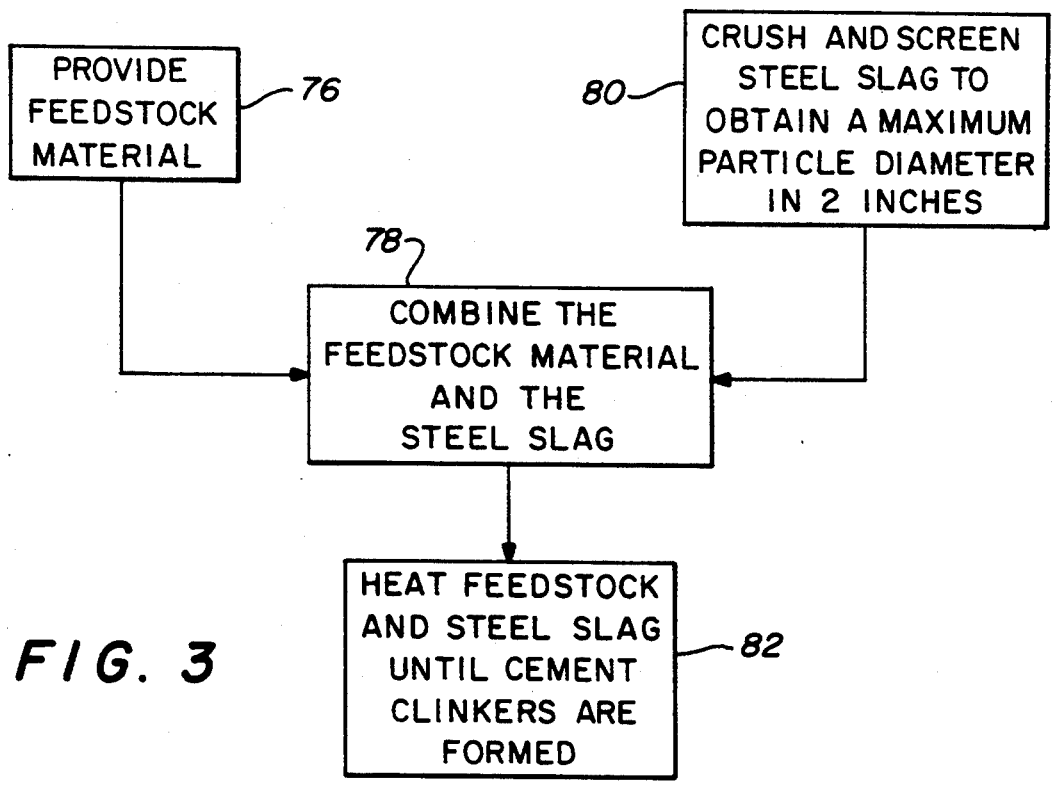
FIG. 3 is a flow chart representation of the process in which the feedstock material and the steel slag are fed into the input-end of the kiln in a combined mixture.

The present invention allows steel slag to be added to the kiln feed as a separate component at the feed-end of the rotary cement kiln in various particle sizes to a maximum of 2" in diameter. Most steel slag has particles below 2" in diameter and thus a crushing and screening process is required to achieve only the desired maximum particle size. No fine grinding, pulverizing or comminution of steel slag is required by the present invention. The invention provides a method of utilization of various steel slags in a much coarser state than previously recognized in rotary cement kiln processes which allows the elements in the chemical compounds of the steel slag, i.e., $C_2S$, and the like, to become an integral part of the cement clinker. As understood by those skilled in the art, the chemistry of the slag must be understood and controlled as part of the overall ingredients of the cement and thus the quantity of the steel slag being added to the feedstock must be balanced with the feedstock materials and their chemical compounds.

In a laboratory furnace burn test of 100% slag, the melting point of the steel slag was determined and is the key to its use in a cement kiln. As can be seen in Table I, the melting point was determined to be 2372° F./1300° C. which allows the slag to be added to the feed-end of the kiln in fairly large particle sizes up to 2" in diameter.

TABLE I
STEEL SLAG LAB FURNACE BURN

| Temperature C. Deg. | Temperature F. Deg. | Effect on Slag |
|---|---|---|
| 1000 | 1832 | None |
| 1100 | 2012 | None |
| 1200 | 2192 | Slightly Sticky |
| 1300 | 2372 | Melts |

Test run 15 minutes at each temperature
Slag Size - Approximately ⅜" Pieces

The tests set forth in Table I were run 15 minutes at each temperature with slag size approximating ⅜" particles. As a result of the tests, it has been determined that the slag will not thicken slurry in the chain section of the rotary kiln, cause mud rings or increase dust loss because of particle size. Further, it will reduce moisture content as much as 2.2%. The steel slag begins to melt and combine with other raw materials somewhere between the calcination zone and the burning zone in the rotary kiln. Because of the low melting point, it is not necessary to grind, pulverize or comminute this material such as in the prior art which requires 80% of the material to pass through a 200-mesh screen for a chemical combination with other ingredients. $C_2S$ formation has already been accomplished in the steel slag and $C_3S$ formation takes place in the rotary kiln in the same temperature zone where it melts. X-ray diffraction analysis of the steel slag shows composition to be a highly fluxed beta ($\beta$), dicalcium silicate $2CaO.SiO_2(C_2S)$. This compound, with addition of CaO, can be converted to $3CaO.SiO_2$ ($C_3S$) in the burning zone of the rotary kiln. $C_3S$ is the main strength-bearing compound in cement.

The apparatus of the present invention is illustrated in FIG. 1. The apparatus 10 includes the rotary kiln 12 supported in a well-known manner by flanges 14 that rotate with the kiln. The kiln has a feed-end 16 and a heat-end or burning zone 18. The heat-end 18 is tilted downwardly with respect to the feed-end 16 as is well known in the art. A fuel source 20 creates a flame 22 in the heat-end 18 of the rotary kiln 12 to provide a temperature of approximately 1500° C. (2732° F.). Cement raw materials or feedstock such as limestone, clay, sand and the like is carried by a variable speed conveyor belt 24 to the rotary kiln 12. If a wet slurry is used, the variable speed conveyor belt 24 will convey the feedstock to a grinder 26 and from the grinder 26 to the feed-end 16 of the rotary kiln 12. The feedstock moves in a stream 28 through the rotating kiln 12 toward the flame 22. The well-known chemical processes take place within the kiln 12 and the cement clinker 30 exits the heat-end 18 of kiln 12 for further processing. Pollution control devices 32 and 34, well known in the art, are at the heat-end and feed-end, respectively, of the kiln 12. At the heat-end 18, out of the pollution control device 32, waste gases 38 are expelled to atmosphere and reclaimed waste products 40 are recovered.

At the feed-end 16, the pollution control equipment 34 removes the waste gases 36 which are expelled and reclaims the waste products at 42.

In the present invention, the steel slag 44 is carried by a conveying device 46, such as a variable speed conveyor belt, to the feedstock material 48 that is being fed through a dust hopper 56 (FIG. 2) at the feed-end 16 of the rotary kiln 12. A controller 25 controls the speed of the conveyor belts 24 and 46 so that the proper proportion of steel slag 44 is provided relative to the feedstock depending upon the chemical compositions thereof. Such control is well known in the art and will not be discussed in detail.

FIG. 2 is a diagrammatic representation of the apparatus for providing a separate feed of the steel slag and the feedstock into the input-end of the rotary kiln 12. In FIG. 2, it can be seen that the steel slag 50 is dropped into a hopper 52 and carried upwardly by a conveying system 54 where it is deposited at 55 so as to pass through the dust hopper 56 to the input-end 16 of the rotating kiln 12. The feed of the material to the input-end of the kiln can be done in any well-known manner. In like manner, the feedstock material 58 is dropped into a hopper 60 where it is carried upwardly by conveyor means 62 and dropped at 64 into the hopper 56 for feeding into the input-end 16 of the rotary kiln 12. Either the apparatus of FIG. 1 or FIG. 2 produces the desired results.

Table II sets forth the results of the chemical analysis of 6 samples of steel slag taken from a steel slag stockpile at random. Of course, the chemical analysis of steel slag may vary from the values in Table II depending upon the slag.

TABLE II

| Sample # | 1 | 2 | 3 | 4 | 5 | 6 | Avg |
|---|---|---|---|---|---|---|---|
| STEEL SLAG | | | | | | | |
| SiO2 | 14.92 | 13.80 | 13.26 | 13.26 | 14.44 | 13.91 | 13.93 |
| Al2O3 | 7.37 | 7.01 | 6.51 | 6.21 | 7.70 | 6.51 | 6.89 |
| Fe2O3 | 25.31 | 25.31 | 27.02 | 26.94 | 25.95 | 26.09 | 26.10 |
| CaO | 34.10 | 37.07 | 37.07 | 32.18 | 34.28 | 34.77 | 34.91 |
| MgO | 6.54 | 7.54 | 7.33 | 6.75 | 7.38 | 6.41 | 6.99 |
| SO3 | 0.23 | 0.26 | 0.11 | 0.16 | 0.19 | 0.08 | 0.17 |
| P2O5 | | | | | | | |
| TiO2 | | | | | | | |
| Cr2O3 | 1.27 | 1.19 | 1.22 | 1.20 | 1.07 | 1.01 | 1.16 |
| Mn2O3 | 7.00 | 6.63 | 6.17 | 6.54 | 6.62 | 6.54 | 6.58 |
| Na2O | 0.13 | 0.12 | 0.10 | 0.17 | 0.14 | 0.07 | 0.12 |
| K2O | 0.02 | 0.02 | 0.02 | 0.03 | 0.02 | 0.01 | 0.02 |
| ZnO | 0.07 | 0.13 | 0.02 | 0.02 | 0.02 | 0.01 | 0.05 |
| SrO | 0.04 | 0.04 | 0.02 | 0.04 | 0.04 | 0.04 | 0.04 |
| LOSS | 2.60 | 2.69 | 1.98 | 0.90 | 0.29 | (0.09) | 1.40 |
| TOTAL | 99.60 | 101.81 | 100.83 | 94.39 | 98.14 | 95.35 | 98.35 |
| F.L. | 0.33 | 0.72 | 0.44 | 0.55 | 0.50 | 0.44 | 0.50 |
| COMBINED H2O @ 700 F. | 1.45 | 1.25 | 1.04 | 0.90 | 0.92 | 1.00 | 1.09 |

It can be seen that the steel slag compositions are very uniform and suitable for the manufacture of cement. It can also be seen that the average free lime is 0.50% and that the average LOI (Loss On Ignition) is 1.40. The free moisture is 1% and the combined moisture is 1%.

An X-ray diffraction analysis of the steel slag shows the composition to be highly fluxed beta ($\beta$) dicalcium silicate $2CaO.SiO_2(C_2S)$. This compound can be converted to tricalcium silicate, $3CAO.SiO_2$ ($C_3S$), in the burning zone using additional CaO. The reaction is $2CaO.SiO_2 + CaO + heat \rightarrow 3CaO.SiO_2$. $C_3S$ is the main strength compound in cement.

Table III illustrates the typical mix calculations for a feedstock having 0% steel slag, 89.67% limestone, 4.42% shale, 4.92% sand, and 0.99% shale.

TABLE III

TYPE I LA MIX CALCULATION - 0% SLAG

|  | LS | SHALE | SAND | ORE |
|---|---|---|---|---|
| SiO2 | 8.25 | 49.25 | 90.00 | 0.81 |
| Al2O3 | 2.31 | 18.60 | 3.24 | 0.28 |
| Fe2O3 | 1.30 | 5.79 | 1.90 | 96.17 |
| CaO | 47.60 | 3.30 | 0.51 | 0.51 |
| MgO | 0.46 | 1.25 | 0.07 | 0.70 |
| SO3 | 0.90 | 3.37 | 0.13 | 0.11 |
| P2O5 | 0.00 | 0.00 | 0.00 | 0.00 |
| TiO2 | 0.00 | 0.00 | 0.00 | 0.00 |
| Na2O | 0.10 | 0.73 | 0.03 | 0.03 |
| K2O | 0.50 | 3.10 | 0.31 | 0.04 |

CLINKER ANALYSIS

|  | SLURRY | CLINKER |
|---|---|---|
| SiO2 | 14.01 | 21.78 |
| Al2O3 | 3.06 | 4.75 |
| Fe2O3 | 2.46 | 3.83 |
| CaO | 42.86 | 66.62 |
| MgO | 0.48 | 0.74 |
| SO3 | 0.96 | 0.75 |
| P2O5 | 0.00 | 0.21 |
| TiO2 | 0.00 | 0.21 |
| Na2O | 0.12 | 0.19 |
| K2O | 0.60 | 0.50 |
| TOTAL |  | 99.59 |
| S/R |  | 2.42 |
| A/F |  | 1.35 |
| C3S |  | 63.33 |
| C2S |  | 14.66 |
| C3A |  | 7.22 |
| C4AF |  | 11.65 |

Table IV illustrates the mix calculations for a feedstock of 90.79% limestone, 3.64% shale, 5.36% sand, and 0.21% ore with the addition of 5% slag and Table V illustrates the mix calculations for a feedstock of 91.43% limestone, 2.75% shale, 5.82% sand, and 0% ore with the addition of 10% slag.

TABLE IV

TYPE I LA MIX CALCULATION - 5% SLAG

|  | LS | SHALE | SAND | ORE | SLAG |
|---|---|---|---|---|---|
| SiO2 | 8.25 | 49.25 | 90.00 | 0.81 | 13.93 |
| Al2O3 | 2.31 | 18.60 | 3.24 | 0.28 | 6.89 |
| Fe2O3 | 1.30 | 5.79 | 1.90 | 96.17 | 26.1 |
| CaO | 47.60 | 3.30 | 0.51 | 0.51 | 36.9 |
| MgO | 0.46 | 1.25 | 0.07 | 0.70 | 6.99 |
| SO3 | 0.90 | 3.37 | 0.13 | 0.11 | 0.00 |
| P2O5 | 0.00 | 0.00 | 0.00 | 0.00 | 0.00 |
| TiO2 | 0.00 | 0.00 | 0.00 | 0.00 | 0.00 |
| Na2O | 0.10 | 0.73 | 0.03 | 0.03 | 0.12 |
| K2O | 0.50 | 3.10 | 0.31 | 0.04 | 0.02 |

CLINKER ANALYSIS

|  | SLURRY | CLINKER |
|---|---|---|
| SiO2 | 14.11 | 21.78 |
| Al2O3 | 2.95 | 4.75 |
| Fe2O3 | 1.69 | 3.83 |
| CaO | 43.36 | 66.62 |
| MgO | 0.47 | 1.05 |
| SO3 | 0.95 | 0.70 |
| P2O5 | 0.00 | 0.20 |
| TiO2 | 0.00 | 0.20 |
| Na2O | 0.12 | 0.18 |
| K2O | 0.58 | 0.50 |
| TOTAL |  | 99.81 |
| S/R |  | 2.43 |
| A/F |  | 1.34 |
| C3S |  | 63.61 |
| C2S |  | 14.46 |
| C3A |  | 7.71 |
| C4AF |  | 11.65 |

TABLE V

TYPE I LA MIX CALCULATION - 10% SLAG

|  | LS | SHALE | SAND | ORE | SLAG |
|---|---|---|---|---|---|
| SiO2 | 8.25 | 49.25 | 90.00 | 0.81 | 13.93 |
| Al2O3 | 2.31 | 18.60 | 3.24 | 0.28 | 6.89 |
| Fe2O3 | 1.30 | 5.79 | 1.90 | 96.17 | 26.1 |
| CaO | 47.60 | 3.30 | 0.51 | 0.51 | 36.9 |
| MgO | 0.46 | 1.25 | 0.07 | 0.70 | 6.99 |
| SO3 | 0.90 | 3.37 | 0.13 | 0.11 | 0.00 |
| P2O5 | 0.00 | 0.00 | 0.00 | 0.00 | 0.00 |
| TiO2 | 0.00 | 0.00 | 0.00 | 0.00 | 0.00 |
| Na2O | 0.10 | 0.73 | 0.03 | 0.03 | 0.12 |
| K2O | 0.50 | 3.10 | 0.31 | 0.04 | 0.02 |

CLINKER ANALYSIS

|  | SLURRY | CLINKER |
|---|---|---|
| SiO2 | 14.13 | 21.47 |
| Al2O3 | 2.81 | 4.69 |
| Fe2O3 | 1.46 | 4.68 |
| CaO | 43.64 | 65.69 |
| MgO | 0.46 | 1.35 |
| SO3 | 0.92 | 0.70 |
| P2O5 | 0.00 | 0.20 |
| TiO2 | 0.00 | 0.20 |
| Na2O | 0.11 | 0.17 |
| K2O | 0.56 | 0.50 |
| TOTAL |  | 99.65 |
| S/R |  | 2.20 |
| A/F |  | 1.09 |
| C3S |  | 61.39 |
| C2S |  | 15.25 |
| C3A |  | 5.55 |
| C4AF |  | 14.25 |

Clearly, from Tables III, IV and V, it can be seen that the addition of slag is suitable as the raw material for the manufacture of cement clinker.

FIG. 3 illustrates the process of the present invention wherein the feedstock material and steel slag are combined as illustrated in FIG. 1 before entering the kiln at the feed-end thereof. At step 76, the feedstock material is provided and combined at step 78 with the steel slag that has been crushed and screened to obtain a maximum diameter of 2 inches at step 80. The combined material is then fed into the feed-end of the rotary kiln at step 82.

Figure 4:
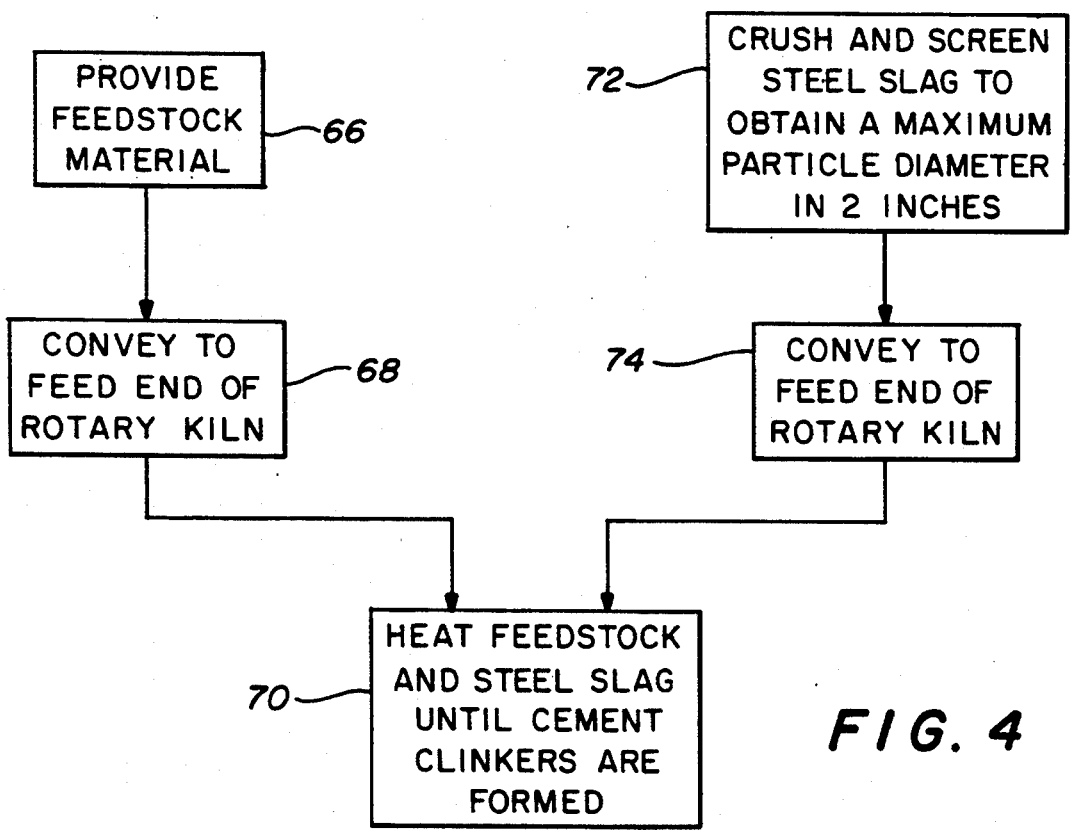
FIG. 4 is a flow chart representation of an alternate process in which the feedstock material and the steel slag are fed separately into the input or feed-end of the rotary kiln.

In FIG. 4, the process feeds the steel slag and the feedstock into the feed-end of the rotary kiln separately as illustrated in FIG. 2. In such case, at step 66 the feedstock material is provided and conveyed by a conveying means at step 68 to the inlet or feed-end of the rotary kiln. The steel slag is crushed and screened to obtain a maximum diameter of two inches at step 72 and the resultant end product is conveyed at step 74 to the inlet or feed-end of the rotary kiln. At step 70, the feedstock and steel slag is heated in the rotary kiln until cement clinker is formed.

Thus there has been disclosed a method and apparatus for forming cement clinker with the addition of coarse steel slag which is fed, with the feedstock material into the feed-end of the rotary kiln. Coarse steel slag is defined herein as steel slag that has been crushed and screened to a maximum diameter of 2". Many advantages are obtained by the present invention. No fine grinding, pulverizing or comminution of the slag is required. Large quantities of coarse slag up to the 2" particle size can be incorporated into the cement clinker composition with only minor chemical changes required in the regular material fed to the rotary kiln.

No drying of the slag is required. Inherent moisture normally runs one to six percent. In the wet process rotary kiln system, substantial moisture reduction and savings are realized. In the dry process rotary kiln system, the steel slag may be dried but it is not necessary.

With the present invention, coarse steel slag can be utilized in the production of cement clinker by the way of the rotary kiln as part of the initial feedstock. The steel slag and wet (or dry) feedstock are injected into the feed-end of the rotary kiln as separate materials. They also may be injected together at the feed entrance of the kiln with prior blending. No plugging of the kiln has been experienced due to mud ring or clinker buildups. In both the wet and the dry process rotary kilns, the steel slag has a cleaning effect on material buildup as it moves through the kiln.

Only slight chemical changes are required for the normal feedstock to accommodate the steel slag. This usually means that the feedstock must be richer in lime content. The chemical compound structure of the coarse steel slag transforms to the desired cement clinker structure during the heat treatment within the rotary kiln by diffusion. Because grinding, pulverizing or comminution of the steel slag is not required, substantial energy savings are realized using this invention to produce cement clinker. Production increases are almost proportional to the amount of slag utilized. Further, the environmental condition of the rotary kiln process improves because of the low volatile content of the steel slag. Further, recycling of the steel slag improves the environment and provides a useful outlet for steel slag rather than the steel slag occupying vast areas of land space for storage. Thus recycling of the steel slag improves the environment and reduces the cost of cement production substantially.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A method of cement clinker manufacture using an elongated rotary cement kiln having a feed-end and a heat-end, the heat-end being tilted downwardly with respect to the feed-end, the method comprising the steps of:

directing heat from a heat source into said heat-end of the kiln;

introducing a stream of feedstock material containing lime into said feed-end of the kiln such that the stream of feedstock material moves toward said heat at the heat-end of the kiln; and adding an amount of crushed and screened steel slag to said stream of feedstock material at said feed-end of the kiln, such that as the stream of feedstock material and steel slag moves toward said heat-end, the steel slag is melted by said heat and diffused into the feedstock material to form cement clinkers.

2. A method as in claim 1 further including the step of crushing and screening said steel slag to obtain particles with a maximum diameter of substantially 2" for addition to said stream of feedstock material.

3. A method as in claim 1 wherein the steel slag is added to the feed-end of kiln as a material separate from the feedstock material.

4. A method as in claim 1 wherein the steel slag and the feedstock material are blended prior to being introduced into the feed-end of the kiln.

5. A method as in claim 1 further including the step of using a wet process rotary kiln to receive the stream of feedstock material and steel slag.

6. A method as in claim 1 further including the step of using a dry process rotary kiln to receive the stream of feedstock material and the steel slag.

7. A method as in claim 1 wherein said steel slag has a chemical composition of $2CaO \cdot SiO_2$ ($C_2S$).

* * * * *

(12) REEXAMINATION CERTIFICATE (4371st)
United States Patent
Young

(10) Number: US 5,421,880 C1
(45) Certificate Issued: Jun. 5, 2001

(54) METHOD AND APPARATUS FOR USING STEEL SLAG IN CEMENT CLINKER PRODUCTION

(75) Inventor: Rom D. Young, Dallas, TX (US)

(73) Assignee: Texas Industries, Inc., Dallas, TX (US)

Reexamination Request:
No. 90/005,676, Mar. 14, 2000

Reexamination Certificate for:
Patent No.: 5,421,880
Issued: Jun. 6, 1995
Appl. No.: 08/182,617
Filed: Jan. 14, 1994

(51) Int. Cl.$^7$ .................................................. C04B 7/36
(52) U.S. Cl. .................... 106/756; 106/745; 106/767; 106/791; 106/792
(58) Field of Search .......................... 106/793, 757, 106/756, 758, 767, 789, 792, 791, 745

(56) References Cited

U.S. PATENT DOCUMENTS

| | | |
|---|---|---|
| 1,073,820 | 9/1913 | Richards. |
| 1,775,313 | 9/1930 | Lellep. |
| 2,471,562 | 5/1949 | Fitterer .......................... 75/24 |
| 3,017,246 | 1/1962 | Kamlet .......................... 23/153 |
| 3,923,717 | 12/1975 | Lalk et al. .................. 260/29.6 |
| 4,026,717 | 5/1977 | Harris et al. .................. 106/100 |
| 4,054,464 | 10/1977 | Thorn, Jr. et al. ............ 106/100 |
| 4,124,404 | 11/1978 | Suzuki et al. .................. 106/103 |
| 4,126,480 | 11/1978 | MacWilliams .................. 106/100 |
| 4,174,961 | 11/1979 | Wolfs et al. .................... 75/30 |
| 4,213,791 | 7/1980 | Wilson, Sr. .................... 106/100 |
| 4,342,598 | 8/1982 | Kogan .......................... 106/100 |
| 5,156,676 | 10/1992 | Garrett et al. .................. 106/745 |
| 5,393,342 | 2/1995 | Hooykaas ...................... 106/714 |
| 5,421,880 | 6/1995 | Young .......................... 106/756 |

FOREIGN PATENT DOCUMENTS

| Number | Date | Country | Class |
|---|---|---|---|
| 2829370 | 1/1979 | (DE). | |
| 2833857 | 2/1980 | (DE) | C04B/7/44 |
| 151150 | 10/1981 | (DE). | |
| 3609568 | 9/1987 | (DE) | C04B/7/153 |
| 3633736 | 4/1988 | (DE) | C04B/28/08 |
| 0034690 | 9/1981 | (EP) | C04B/7/14 |
| 0162215 | 11/1985 | (EP) | C04B/7/24 |
| 0171253 | 2/1986 | (EP) | C04B/35/66 |
| 0188618 | 7/1986 | (EP) | C04B/7/21 |
| 0312323 | 4/1989 | (EP). | |
| 0393189 | 4/1990 | (EP). | |
| 0397862 | 4/1990 | (EP) | C04B/22/08 |
| 0375081 | 6/1990 | (EP) | C04B/28/08 |
| 2480136 | 10/1981 | (FR) | B01J/2/12 |
| 2486066 | 1/1982 | (FR). | |
| 2681592 | 3/1993 | (FR) | C04B/7/153 |
| 2208857 | 4/1989 | (GB). | |
| 2211182 | 6/1989 | (GB) | C04B/7/32 |
| 13794 | 8/1967 | (JP). | |
| 30103 | 9/1970 | (JP). | |
| 21420 | 2/1979 | (JP) | C04B/7/02 |
| 57529 | 2/1979 | (JP). | |
| 69137 | 6/1979 | (JP). | |
| 90449 | 7/1980 | (JP) | C04B/7/36 |
| 149359 | 11/1981 | (JP) | C04B/7/36 |
| 223649 | 12/1983 | (JP) | C04B/7/38 |
| 13652 | 1/1984 | (JP). | |
| 61 48472 | 8/1984 | (JP). | |

(List continued on next page.)

OTHER PUBLICATIONS

The New Encylopaedia Britannica, Hydraulic Cements., vol. 13, pp. 11–14—Adhesives, (no date).
9201083—Chemical Abstracts 112 (1990) Jan. 8, No. 2.
V.D. Barbanyage, V.M. Shamshurov, T.I. Timoshenko, Characteristics of the Sintering Process of Cement Mixes, *Belgorod Technological Institute of Construction Materials*, Tsement, No. 2, 1993, pp. 21–24, (no month).

(List continued on next page.)

*Primary Examiner*—Michael Marcheschi

(57) ABSTRACT

A process and apparatus by which steel slag can be added to the feedstock materials fed into the feed-end of a rotary cement kiln to form cement clinkers. The steel slag is crushed and screened to provide steel slag particles having a maximum diameter of 2".

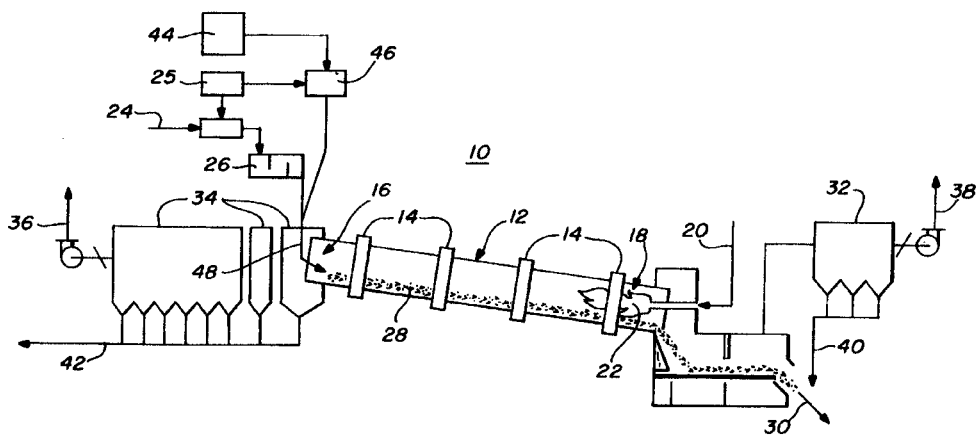

FOREIGN PATENT DOCUMENTS

| | | | |
|---|---|---|---|
| 54948 | 3/1985 | (JP) | C04B/5/00 |
| 192440 | 7/1990 | (JP) | |
| 267142 | 10/1990 | (JP) | C04B/7/26 |
| 224147 | 8/1992 | (JP) | |
| 139135 | 7/1987 | (PL) | |
| 610813 | 6/1978 | (RU) | |
| 658102 | 5/1981 | (RU) | |
| 969692 | 10/1982 | (RU) | |
| 1206247 | 1/1986 | (RU) | |
| 513950 | 5/1976 | (SU) | C04B/7/18 |
| 772394 | 10/1980 | (SU) | |
| 1079624 | 7/1986 | (SU) | |
| 1608155 | 11/1990 | (SU) | |
| 8301443 | 4/1983 | (WO) | |
| 8601795 | 3/1986 | (WO) | C04B/28/06 |
| 8904815 | 6/1989 | (WO) | |
| 9003343 | 4/1990 | (WO) | |
| 9003344 | 4/1990 | (WO) | C04B/22/08 |
| 9104953 | 4/1991 | (WO) | C04B/14/42 |

OTHER PUBLICATIONS

Geiseler, Juergen, *Utilization of Steel Works Slag*, presented at the Ironworks Day on Nov. 5, 1990, in Duesseldorf, Stahl u. Eisen 111 (1991), No. 1, 133–138.

E.G. Drevitskii, A.G. Dobrovol'skii, A.A. Korobok, *Increasing Operating Efficiency of Rotary Kilns*, Moscow, Stroiizdat, 1990, pp. 98–101, (no month).

A.P. Vitushkin, V.N. Panyushkina, Saving Fuel and Energy Resources in Cement Production, *Report from an All–Union Seminar*, Tsement, No. 2, pp. 8–9, 1988, (no month).

A.A. Pachchenko, E.A. Myasnikova, V.V. Takarchuk, Clinker Formation in Unground Raw Material Mixes, Kiev Polytechnic Institute, Tsement, 4:20–21, 1987, (no month).

Recommendations on Development of New Processing Operations, Excerpt from *Cement Industry*, Review information No. 1, "Clinker formation in oxide–salt melts", Moscow, 1987, pp. 43–49, 58–60, (no month).

Yu.G. Ench, N.P. Kogan, O.P. Mchedlov–Petrosyan, *Sulfate–Resistance Portland Cement Based on Ferruginous Waste Slags*, Yuzhgiprotsement, Source Not Available, pp. 14–15, (no date).

*Pulse Technology in Cement Production*, Source Not Available, (date unknown).

Yu.G. Ench, N.P. Kogan, O.P. Michedlov–Petrosyan, *Phsciochemical Processes Occurring During Firing of a Raw Material Charge with Addition of Slag*, Yuzhgiprotsement, Tsement, No. 3, pp. 9–11, 1984, (no month).

N.P. Kogan, A.I. Piven', I.I. Timchenko, V. Ya. Ryazantsev, D.N. Verbitskii, O.N. Zhukova, Effect of Self–Decomposing Waste Blast Furnace Slag on Firing of Cement Clinker, "New Trends in Intensification and Investigation of Clinker Firing and Cement Setting Processes", *Transactions of the State All–Union Scientific Research Institute of the Cement Industry*, No. 76, Moscow, 1983, pp. 110–115, (no month).

R.M. Dzvonkovskii, A.P. Kholodnii, M.M. Korobov, A.P.. Osokin, New Energy–Saving Clinker Firing Process (S–Firing), "New Trends in Intensification and Investigation of Clinker Firing and Cement Setting Processes", *Transactions of the State All–Union Scientific Research of the Cement Industry*, No. 76, Moscow, 1983, pp. 90–96, (no month).

M.V. Babich, V.L. Bernshtein, A.I. Zdorov, Optimization of Composition of Raw Material Mixes for Firing of Clinkers in Kilns of the Dry Method of Production, "New Trends in Intensification and Investigation of Clinker Firing and Cement Setting Processes", *Transactions of the State All–Union Scientific Research Institute of the Cement Industry*, No. 76, Moscow, 1983, pp. 52–58, (no month).

Illegible authors & R.I. Timchenko, A. Yu. Turchik, Intensification of Firing Process by Using Components with Increased Chemical Energy in the Composition of a Raw Material Mix, "New Trends in Intensification and Investigation of Clinker Firing and Cement Setting Processes", *Transactions of the State All–Union Scientific Research Institute of the Cement Industry*, No. 76, Moscow, 1983, pp. 40–51, (no month).

A.I. Zdorov, Ya. Yu. Grodzinkskii, S.T. Lobkovskaya, *Use of Industrial Wastes in Cement Production*, Yuzhgiprotsement, Tsement, 7:9–10, 1983, (no month).

V.L. Bernshtein, M.V. Babich, *Use of Metallurgical Wastes in Cement Production, Yuzhgiprotsement, Use of Technogenic Materials in Cement Production, Transactions of the State All–Union Scientific Research Institute of the Cement Industry*, Moscow, 1982, pp. 23–29, (no month).

Use of Copper–Smelting Slags in Cement Production, *Cement Industry, Series 1 (Review Information), No. 1*, Moscow, 1981, pp. 3–27, (no month).

V.A. P'yachev, *Effective Ferruginous Raw material for Clinker Production*, Tsement, 5, May 1981.

V.A. P'yachev, V.N. Cherepanova, S.V. Saenko, *Use of Slags From Oxidized Nickel Ores in the Production of Clinker*Kompleksnoe ispol'zovanie mineral'nogo syr'ya, 6:32–36, 1980, (no month).

R. Dogandzhieva, V. Vylkov, I. Vylkova, V, Vylkov, L. Gigova, Use of Slags from the Kremikovets Integrated Iron and Steel Works in the Production of Portland Cement Clinker, *Transactions of the 5th All–Union Scientific–Technical Conference on Chemistry and Technology of Cement*, Moscow, 1980, pp. 160–163, (no month).

B.V. Volkonskii, L. Ya. Gol'dshtein, S.D. Makashev, Problems of Use of Technogenic Byproducts and Industrial Wastes in Cement Production, *Transactions of the 5th All–Union Scientific–Technical Conference on Chemistry and Technology of Cement*, Moscow, 1980, pp. 142–144, (no month).

S.A. Sad'kova, E.R. Priev, Improvement of Properties of Loess Brick, Stroit. Mater., 7:12, 1980, (no month).

A.S. Saduakasov, D.N. Abishev, V.A. Ashirov, R.Zh. Dzhakupova, K.M. Satova, Zh. K. Abil'daev, *Electrothermophosphorus Slag—Raw Material for Production of Binders and Refractories*, Kompleksnoe ispol'zovanie mineral'nogo syr'ya, 1:51–56, 1980, (no month).

V.I. Zharko, *Effectiveness of Additional Supply of Blast Furnace Slag to the Kiln*, Tsement, 11:8, 1978, (no month).

V.A. P'yachev, V.N. Cherepanova, Ya. Sh. Shkhol'skaya, *Highly Basic Blast Furnace Slag As a Raw Material Component in the Production of Cement Clinker*. (no date).

Von M. Schmidt, *Cement with Interground Additives*, ZKG Apr. 1992, Edition B (English version).

Von M.E. Asim, *Blastburnace Slag Processing to Blended Cements*, ZKG Dec. 1992, Edition B (English version).

Von J. Stark, A. Müller,*International Development Trends in Low–Energy Cements*, ZKG, Jun. 1988, Edition B (English version).

Von S. Sprung, *Reducing Environmental Pollution by Using Secondary Raw Materials*, ZKG, Jul. 1992, Edition B (English version).

Günter Blunk, Jürgen Geiseler, *The Use of Steelmaking Slags, Represented by Selected Examples*, Stahl U. Eisen 100 (1980) Nr. 3, Feb. 11.

Proceedings of the Third International Symposium on the *Chemistry of Cement*, London, 1952, (no month).

F.M. Lea, *The Chemistry of Cement and Concrete*, 3rd Ed. (no date).

Dr. S.N. Ghosh, *Cement and Concrete Science & Technology*, vol. I, Part I, (no date).

Della M. Roy, *Instructional Modules in Cement Science*, (no date).

Peter C. Hewlett, Lea's *Chemistry of Cement and Concrete*, 4th Ed. (no date).

Waldemar A. Klemm,*Cementitious Materials: Historical Notes*, (no date).

Renichi Kondo, Masaki Daimon, Seishi Goto, Atsushi Nakamura, Tadashi Kobayashi, *Fuel Economized Ferrite Cement Make From Blastfurnace and Converter Slags*, Apr. 13–14, 1976.

N.I. Kogan, Yu. G. Ench, E.V. Degtyar, Ya. A. Kogan, A.I. Piven, I.I. Timchenko *The Use of Waste Slag from the Rustavi Metallurgical Plant in Cement Industry*, 1986, (no month).

N.P. Kogan, O.P. Mchellov–Petrosyan, A.I. Edorov, N.F. Drepin, *Intensification of the Process of Producing Cement Clinker By Calcining a Batch Consisting of Independent Starting Physicochemical Systems*, 1978, (no month).

H.M. Javoronkov, O.P. Mtchedlov–Petrossian, N.P. Kogan, A.I. Zdorov, Y.G. Ientch, *Clinkerization with low Consumption of Energy During Firing of Mixtures Containing Unground Slag*, 1986, (no month).

The Cement Association of Japan, *Review of the Twenty–Eighth General Meeting—Technical Session*, May 1974.

*8th International Congress on the Chemistry of Cement*, Sep. 22–27, 1986.

*Proceedings of the 1985 Beijing International Symposium on Cement and Concrete*, May 14–17, 1985.

D.W. Lewis, *Properties and Uses of Iron and Steel Slags*, Feb. 23, 1982.

D.W. Lewis, *Resource Conservation by Use of Iron and Steel Slags, ASTM STP 774, American Society for Testing and Materials*, 1982, pp. 31–42, (no month).

D.G. Montgomery, G. Wang, *Engineering Uses of Steel Slag—a By–Product Material*, (no date).

Wayne S. Adaska, Stewart W. Tresouthick, Presbury B. West, *Solidification and Stabilization of Wastes Using Portland Cement*, 1991, (no month).

Della M. Roy, *Portland Cement: Constitution and Processing*, (no date).

J.J. Emery, *Slag Utilization in Pavement Construction*, 1982, (no month).

National Slag Association, *Comparison of Chemical and Physical Properties—Three Types of Steel Slag*, (no date).

George Wang, *Properties and Utilization of Steel Slag in Engineering Applications*, 1992, (no month).

U.S. Department of Transportation, *User Guidelines for Waste and By–Product Materials in Pavement Construction*, Publication No. FHWA RD 97–148, Apr. 1998.

W. Watson, Q.L. Craddock, *Cement Chemists' and Works Managers' Handbook*, 1962, (no month).

*Portland Cements: Raw Materials and Processes of Manufacture*, 1970, (no month).

Steven H. Kosmatka, William C. Panarese, *Design and Control of Concrete Mixtures, Portland Cement Association Engineering Bulletin*, 13th Ed., 1988, (no month).

G.W. Josephson, F. Sillers, Jr., D.G. Runner, *Iron Blast–Furnace Slag Production, Processing, Properties, and Uses*, 1949, (no month).

Processed Blast Furnace Slag—The All–Purpose Construction Aggregate, National Slag Association, (no date).

W. Gutt, P.J. Nixon, *Use of Waste Materials in the Construction Industry*, 1979, (no month).

Thomas M. Barnes, James M. Strong, *Use of Lime Values in Steelmaking Slag Wastes*, Oct. 20–21, 1980.

Chart: Nippon Slag Association, *Utilization of Ironization of Iron and Steel Slag in Japan*, (no date).

O.P. Mchedlov–Petrosyan, N.P. Kogan, A.I. Zdorov, *Coarse–Grained Slags as an Additional Constituent of the Cement Raw Mix*, 1981, (no month).

University of Alabama in Birmingham, *International Cnference on Slag and Blended Cements*, Feb. 18–19, 1982.

China Steel Corp., *Slag Utilization Manual*, (no date).

J. Geiseler, Steel Slag—"Generation, Processing and Utilization" *Resource Conservation and Environmental Technologies*, pp. 87–97, 1994, (no month).

B.A. Wills, *Mineral Processing Technology*, 4th Ed., 1988, (no month).

Anne Claire Broughton, Scrap Tires: A Burning Issue, *Recycling Today*, Aug. 1998.

Terry Gray, *Tire Derived Fuel: An Environmentally Friendly Resource*, Mar. 3, 1994.

Jan Skalny, Sidney Mindess, Materials Science of Concrete II, The American Ceramic Society, Inc., 1991, (no month).

N.P. Kogan, O.P. Mchellov–Petrosyan, A.I. Edorov, N.F. Drepin, *Intensification of the Process of Producing Cement Clinker by Calcining a Batch Consisting of Independent Starting Physiochemical Ssytems*, Doklady adademii nauk SSSR, vol. 238, No. 2, 1978, pp. 408–410, (no month).

Intensifying the Process of Calcining Clinker in Rotary Kilns, USSR Ministry of the Building Materials Industry, 1986, (no month).

S.I. Ivanschenko, M.T. Vlasova, Ph.D., V.N. Kalyanova, N. Ya. Mikhalchenkov, V.N. Karnaukohov, E.M. Khavin, G.V. Kulakova, Eng., *Utilizing Copper Smeltery Slag as Mineral Additive*, 1979, (no month).

Jacque Piret, Alain Dralants, Utilizing LD–Slag for the Production of Portland Cement Clinker and Pig Iron, *Journal of Manufacture and Processing of Iron and Steel*, 16/84, Aug. 13, 1984.

Prof. Wieslaw Kuredovski, Dr. of Eng., Krystyna Wieja, Mgr. Eng., Sinterability of Raw Material Compositions Including Blast Furnace Slag, *Cement Lime Gypsum*, Nov.–Dec. 1989.

R. Dogadzhiska, V. Vylkov, I. Vylkova, B. Vylkov, L. Gigova, *Use of Slag From Kremikovtsy Metal Works for the Production of Portland Cement Clinker*, (no date).

I.P. Kogan, O.P. Mchedlov–Petrosyants, A.P. Zdorov, N.F. Drepin, Intensification of the Process of Preparation of Cement Clinker by Roasting Batch that Consists of Independent Starting Physical and Chemical Systems, USSR Academy of Sciences, 1978 vol. 238, No. 2, (no month).

N.M. Zhavoronokov, O.P. Mchadlov–Petrosyan, K.P. Kogan, A.I. Zdorov, I.G. Yench, Clinker Preparation with Low Energy Consumption by Roasting Mixtures Containing Non–Ground Slag, USSR Academy of Sciences, (no date).

J.M. Levert, Y. Riquier, C Gohy, Utilizing LD Slag in the Manufacture of Portland Cement, *Silicates Industriels*, 1982–1, (no month).

V.S. Gorshkov, S.E. Alexandrov, S.I. Ivashchenko, I.V. Gorshkova, *Complex Processing and Use of Metallurgical Slags in Construction Industry*, 1985, (no month).

P.P. Gaidzhurov, V.L. Bernshtein, M.R. Zlatokrylov, Study of the Formation and Properties of Cement Clinker Produced on the Basis of Converter Slags, *Chemistry and Chemical Engineering*, vol. 33, Issue 3, Ivanova 1990, (no month).

F. Puertas, J. Soria, M$^a$T. Blanco–Varela, T. Vázquez, Modification on the Tricalcium Aluminate Phase in Cements by Manganese Substitution, *Cement and Concrete Research*, vol. 18, pp. 837–842, 1988, (no month).

S.C. Akluwalia, C.H. Page, Effect of Law Grade Fuels, Combustible Wastes and Non–Traditional Raw Materials, 9th International Congress on the Chemistry of Cement, vol. 1, 1992, (no month).

P. Liebl, W. Gerger, Benefits and Limitations When Using Secondary Materials, Process Technology of Cement Manufacturing, 1993, (no month).

M.E. Asim, Blastfurnace Slag Processing to Blended Cements, *Zement–Kalk–Gips*, No. 12/1992, pp. E311–E317.

F. Puertas, M$^a$T. Blanco–Varela, A. Palomo, T. Vázquez, Reactivity and Burnability of Raw Mixes Made with Crystallized Blastfurnace Slags—Part I, *Zement–Kalk–Gips*, Nr. 8/1988, pp. 398–402.

F. Puertas, M$^a$T. Blanco–Varela, A. Palomo, T. Vázquez, Reactivity and Burnability of Raw Mixes Made with Crystallized Blastfurnace Slags—Part II, *Zement–Kalk–Gips*, Nr. 12/1998, pp. 628–631.

M. Schmidt, Cement with Interground Additives, *Zement–Kalk–gips*, Apr, 1992, vol. 45.

Ivan Odler, Improving Energy Efficiency in Portland Clinker Manufacturing, *Cement and Concrete Science & Technology*. vol. I, Part I, 1991, (no month).

V.K. Gore, S.A. Khadilkar, P.G. Lele, C.H. Page, A.K. Chatterjee, Conservatio of Raw Material Through Use of Industrial Wastes in Cement Manufacture, 9th International Congress on the Chemistry of Cement, vol. II, 1992, (no month).

A. Dasgupta,*On Making a Special Cement Clinker Using Indian Blast Furnace Slag as a Raw Material*, 1975, (no month).

Robert S. Boynton, *Chemistry and Technology of Lime and Limestone*, 1980, (no month).

J. Grzymek, The Combined Methods of Cement Production, The VI International Congress on the Chemistry of Cement, Moscow, Sep. 1974.

G.K. Moir, F.P. Glasser, Mineralisers, Modifiers and Activators in the Clinkering Process, 9th Intertnational Congress on the Chemistry of Cement, 1992, vol. I, (no month).

D.B.N. Rao, J.M. Brugan, Activity and Utilization of Slag in OPC Influenced by Advanced Grinding, *Wolrd Cement*, vol. 20, No. 6, Jun. 1989.

Robert F. Blanks, Henry L. Kennedy, The Manufacture of Portland Cement, *The Technology of Cement and Concrete*, vol. I, 1955, (no month).

Renichi Kondo, Masaki Daimon, Masanori Asakawa, Takero Ito, Iron Cement Made From Blastfurnace and Converter Slags, Review of the Twenty–Eighth General Meeting—Technical Session, 1974, (no month).

Hiroaki Okumura, Recycling of Iron—and Steelmaking Slags in Japan, First International Conference on Processing Materials for Properties, (no month).

Hideiko Miyairi, Akihira Suzuki, Junsuke Haruna, Ceramic Uses of Blast–Furnace Slag, *Nippon Steel Technical Report*, No. 17, Jun. 1981.

Renichi Kondo, Masaki Daimon, Masanori Asakawa, *Fuel Economized Ferrite Cement Made From Blastfurnace and Converter Slags*, Apr. 13–14, 1976.

Francisca Puertas Maroto, Tomás Vázquez Moreno, *Use of Blast–Furnace Slag as Raw Mix in the Obtaining of Cement and the Modification of its Phases with Maganese Hydration Reactions*, 1987, (no month).

Li Changhua, *The Effect and Principle of Industrial Wastes Used in Wet Rotary Kiln*, (no date).

Cheryl Cvetic Solomon, Slag—Iron and Steel, U.S. Department of the Interior Bureau of Mines, 1993, (no month).

Cement and Concrete Research, *An International Journal*, vol. 23, No. 5, Sep. 1993.

Broyage, *High Efficiency Vertical Mills For Cement Clinker and Slag*, Jan. 1994.

N. Kogan, Dr. O. Mehedlov–Petrossyan, A. Zdorov, N. Drepin, *The Reduction of Specific Heat and Electricla Energy Consumption by the Use of Waste From Metallurgical Processes as Cement Raw Mixture Components*, 1979, (no month).

Academician N.M. Zhavoronkov, A.S. Boldyrev, N.P. Kogan, S.D. Makashev, O.P. Mchedlov–Petrosyan, A.A. Pashchenko, S.A. Fataliev, T. Yu. Shchetkina, *Theoretical Substantiation of the Use of New Types of Raw Material in the Cement Industry*, 1979, (no month).

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–7 is confirmed.

* * * * *